J. H. HOBBS & C. W. BROCKUNIER.
Glass-Mold.

No. 162,233.  Patented April 20, 1875.

WITNESSES  
Frank J. Weisel  
Claudius L. Parker

INVENTOR  
John H. Hobbs,  
Charles W. Brockunier,  
by George H. Christy  
their atty.

THE GRAPHIC CO.PHOTO-LITH.39 & 41 PARK PLACE, N.Y.

UNITED STATES PATENT OFFICE.

JOHN H. HOBBS, OF WHEELING, WEST VIRGINIA, AND CHARLES W. BROCKUNIER, OF BRIDGEPORT, OHIO.

IMPROVEMENT IN GLASS-MOLDS.

Specification forming part of Letters Patent No. 162,233, dated April 20, 1875; application filed March 27, 1875.

*To all whom it may concern:*

Be it known that we, JOHN H. HOBBS, of Wheeling, county of Ohio, State of West Virginia, and CHARLES W. BROCKUNIER, of Bridgeport, county of Belmont, State of Ohio, have invented or discovered a new and useful Improvement in Glass-Molds; and we do hereby declare the following to be a full, clear, concise, and exact description thereof, reference being had to the accompanying drawing making a part of this specification, in which like letters indicate like parts.

Figure 1:
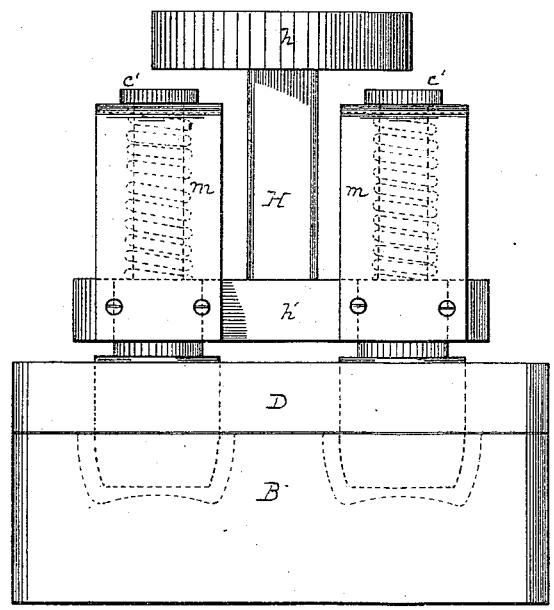
Figure 2:
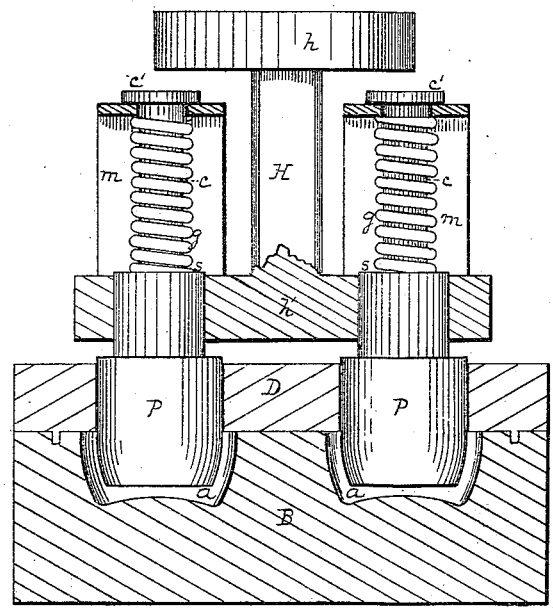

Figure 1 shows a side elevation of our improved molds; and Fig. 2 is a vertical longitudinal sectional view thereof through the mold-cavities, but showing the plungers in side view.

Our improvement relates to the construction of a mold for pressing glassware with two or more pressing-plungers, attached to or connected in operation with a single operating-head, whereby, in connection with a corresponding number of mold-cavities similarly arranged, two or more articles of glassware may be pressed simultaneously, means being provided, in connection therewith, for the inequalities in the amount of molten glass deposited in the several mold-cavities.

In the drawing we have shown our improvement as applied to the making of salt-cellars, or "salts," as they are known in the trade. The mold B, either solid or hinged, as may be preferred, has two or more cavities, $a$, of suitable form for pressing the desired article therein. The ring-plate D has the suitable holes for the operation of a corresponding number of plungers, P, so that the latter may be operative in pressing, in the usual way. These plungers are carried by a plunger-head, H, which, in the form shown, has a plate, $h$, at its upper end, or other suitable means of attachment to the press, and at the lower end it is in the form of an inverted T, the cross-bar $h'$ of the T acting as a guide to the plungers, as shown. The stems $c$ of the plungers extend up through, and by a flanged cap, $c'$, are supported each on, an inverted U-shaped frame, $m$, such frame, at its open end, being securely attached to the cross-bar $h'$. On each stem $c$ we arrange a spiral spring, $g$, one end of which bears against the under side of the cross-plate of the inverted-U frame $m$, and the other against a shoulder, $s$, formed on the plunger or its stem, such spring being made and arranged to resist a compressing force. The plungers now being raised in the usual manner, the amount of molten glass necessary to make the article desired being dropped into each mold-cavity, the plungers are brought down, and the pressing is done in the usual way; and by the use of an independent spring with each plunger we make provision for the unequal amounts of glass which will be deposited in each mold, since, though the plunger in the mold having the greater or the greatest amount of glass must necessarily stop its downward stroke as soon as the cavity formed by it and its mold is full, yet its spring will yield or be compressed somewhat, so that the other plunger or plungers may continue their downward stroke, and each complete the pressing of its own article; and for the purpose of this element of our invention, any suitable form or arrangement of spring may be employed, or a weight or other device of like function may be substituted therefor, and also such spring or weight, or other mechanical equivalent, may be applied to the ring-plate D, (each mold-cavity then having its own separate ring-plate,) or to a movable bottom in the mold, or to any movable part which, in the operation of pressing, goes to form any part of the pressing-face. And we hereby include such modifications as within the scope of our invention, the only difference in operation being that when such yielding device is applied elsewhere than to the plunger, the space to be occupied by the excess of glass is provided for on the outside instead of the inside of the article to be made. But in any case such yielding device is to be regulated or adjusted with reference to the work to be done, as already practiced in the art. The arrangement of the plungers and mold-cavities may be varied at pleasure, as also the number and form of the articles to be made. We use molds of this construction for pressing articles of glassware generally, in either solid or open-and-shut molds, though in the present state of the art it can most advantageously be applied to the pressing of articles of comparatively small size.

What we claim as our invention, and desire to secure by Letters Patent, is—

1. A glass-mold having two or more cavities for the pressing therein of articles of glassware, and a corresponding number of plungers operated simultaneously at each stroke of the machine, in combination with a yielding device arranged in connection with the plunger or some movable part of the mold-cavity, substantially as set forth, whereby provision is made for the excess of material in the fuller cavities, and for the completion of the pressing stroke where the material is less.

2. Two or more plungers, P, carried on and guided by a single head, H, in combination with springs acting on each independently of one another, substantially as set forth.

In testimony whereof we have hereunto set our hands.

JOHN H. HOBBS.
CHAS. W. BROCKUNIER.

Witnesses:
W. J. W. COWDEN,
GEORGE H. CHRISTY.